Patented June 26, 1934

1,963,972

UNITED STATES PATENT OFFICE 1,963,972

MANUFACTURE OF USEFUL PRODUCTS FROM CELLULOSIC MATERIALS

Henry Dreyfus, London, England

No Drawing. Application February 18, 1932, Serial No. 593,856. In Great Britain March 7, 1931

16 Claims. (Cl. 127—37)

This invention relates to the conversion of cellulose or cellulosic materials into dextrins, sugars, and other conversion products by means of hydrogen chloride or other volatile strong mineral acids.

It is known that when cellulose is subjected to the action of strong hydrochloric acid a substantial evolution of heat occurs and that careful precautions have to be taken to ensure adequate cooling if satisfactory results are to be obtained. The provision and control of such cooling is a matter of difficulty, and in the absence of such cooling or proper control of such cooling destruction of the cellulose or reaction products to undesired decomposition products is very liable to occur. Moreover, the use of hydrochloric acid or other volatile mineral acids, whether in gaseous form or in the form of concentrated aqueous solution, has heretofore necessitated the use of large quantities of acids, quantities greatly in excess of those necessary to effect the actual conversion of the cellulose, and the recovery of the acids has been a matter of difficulty.

According to the invention it has been found that these difficulties and disadvantages are largely or entirely avoided by performing the reaction in presence of organic diluents, especially diluents which are insoluble or substantially insoluble in water, and by passing the vapours of the volatile mineral acid into or through the cellulose or cellulosic materials. The cellulose or cellulosic materials may be employed as such or may be impregnated with desired amounts of water or humidity or with small quantities of hydrochloric acid or aqueous solutions of other strong volatile mineral acids.

By means of the invention it is readily possible to avoid troublesome heat evolution with its attendant destructive action. Moreover, by means of the invention only a small quantity of the vapours of the strong mineral acid are necessary to effect the conversion of the cellulose or cellulosic materials.

In performing the invention cellulose or cellulosic materials may be first impregnated with the organic diluents and thereafter hydrogen chloride passed into or through the materials until the desired degree of hydrolysis or conversion is attained. The hydrogen chloride may if desired be employed in admixture with vapours of organic diluents such for instance as the diluents impregnated in the materials to be treated, or inert gases such for instance as nitrogen, carbon dioxide or the like. Further, the hydrogen chloride may be employed either in the form of substantially anhydrous hydrogen chloride vapour or in the form of vapours containing water vapour such for instance as vapours resulting from the evaporation of strong hydrochloric acid.

Benzol, petroleum ether, ether, and methylene chloride may be mentioned as examples of organic diluents particularly suitable for the purposes of the invention. It is to be understood, however, that these diluents are given only by way of example and that the invention is in nowise limited with respect to the organic diluents to be employed.

The cellulose or cellulosic materials may conveniently be impregnated with about 20 to 200% of their weight of the organic diluent or diluents, though it is of course to be understood that the invention is in nowise to be restricted to such relative proportions.

The treatment of the cellulose or cellulosic materials is preferably performed in presence of small or relatively small amounts of water or humidity, for example in presence of less than 70–80% of water relative to the weight of cellulose present in the materials. In cases where the treatment is to be performed in presence of quantities of water or humidity in excess of the normal humidity of the materials, the materials are preferably impregnated in any convenient manner and as uniformly as possible with the necessary amount of water prior to impregnation with the volatile diluent or diluents. In such cases the materials may, if desired, be impregnated with water as such or in the form of hydrochloric acid or other aqueous solutions of the particular volatile strong mineral acid employed for the purposes of the invention. It is preferable to employ small quantities of water or humidity and particularly quantities of water or humidity not exceeding about 30% of the weight of the cellulose or cellulosic materials, especially in cases where the diluent or diluents are not soluble in water.

The treatment of the impregnated materials with the hydrogen chloride or mixture of gases or vapours containing the same can, of course, be performed in any convenient way. During the treatment with the hydrogen chloride or mixtures of gases or vapours containing the same, the materials are preferably subjected to stirring or other agitation to ensure uniform action upon the materials, for instance the materials may be subjected to the treatment in rotating drums, tumbler barrels or the like. The treatment of the materials may take place at substantially ordinary room temperature, e. g. 10° to 30° C. or 40° C. Whilst the use of such temperatures is to be preferred the invention is in nowise limited in this respect as the materials subjected to the treatment may be heated to higher temperatures such for instance as up to about 70° C. or may even be cooled to low temperatures such for instance as 0° to 5° C. In cases where the hydrogen chloride is only to act to such a stage that primary conversion products insoluble both in water and in the diluent or diluents are to be produced the use of temperatures not substantially exceeding about 30° C. to 40° C. is especially advantageous.

The duration of the treatment with the hydrogen chloride or the mixture of vapours or gases containing the same may vary considerably according to the nature of the materials to be treated, the temperature and the degree of hydrolyzation it is desired to attain. Usually, however, a period of from about 1 to 6 hours is at the low temperatures above indicated sufficient to transform substantially all the cellulose present into primary conversion products insoluble both in water and in the diluent or diluents. If higher temperatures are employed the time of treatment is shortened correspondingly, but the use of higher temperatures presents no advantage, on the contrary higher temperatures are liable to lead to the formation of undesirable products of reaction. In cases where it is desired to transform the cellulose or cellulosic materials into products of a further stage of conversion, for instance to sugars, the time of treatment is of course necessarily lengthened, for instance treatments of from 12 to 24 hours or more result in the transformation of the materials substantially entirely into sugars. It is preferable to allow the hydrogen chloride or mixture of gases or vapours containing the same to act upon the cellulose or cellulosic materials only to such a stage that there result primary conversion products insoluble both in water and in the diluent or diluents employed.

The primary conversion products may readily be freed from the acid contained therein by washing or extracting with volatile organic solvents for the hydrogen chloride. As many of the organic diluents of the invention are volatile solvents for hydrogen chloride it is usually possible to remove the hydrogen chloride entirely or to any desired extent with the same diluent or diluents as are employed for the impregnation referred to. After extraction with the volatile solvent the materials may be gently heated or warmed, with or without the use of reduced pressure, to remove residual volatile solvent. Or for instance the hydrogen chloride may be removed to the desired degree or substantially entirely by treating the primary conversion product with water. When the hydrogen chloride is removed in such manner the diluent simultaneously removed from the materials may in many cases be readily recovered by simple separation from the extracting water as the diluents of the invention are in many cases insoluble in water.

The primary conversion products may if desired be subjected to treatment to produce products of further hydrolyzation such for instance as fermentable sugars. In this connection it is to be noted that the yield of fermentable sugars is much greater if the primary conversion products are subjected to a separate hydrolyzation treatment instead of allowing the hydrogen chloride (or mixture of gases or vapours containing the same) to act to such a degree that sugars result. The separate further hydrolyzation can be effected by any convenient means. For instance the primary conversion product may be heated or boiled with water or dilute acids with or without the use of increased pressure until the desired degree of hydrolysis is attained. In cases where dilute acids are to be employed the hydrogen chloride left in the conversion products after hydrogen chloride has been extracted to the desired degree or remaining in the primary conversion products without any such extraction may usefully serve this purpose, water being added to the materials until the desired low degree of acidity, e. g. ½ to 2% acidity, is attained. Or for instance the primary conversion product instead of being subjected to the action of dilute hydrochloric acid may, after removal of the hydrogen chloride in the manner before indicated, be heated or boiled with dilute sulphuric acid (e. g. of about ¼ to 2% strength) or even with water, with or without the use of increased pressure until the desired degree of hydrolyzation is attained.

It is preferable to remove the diluent from the primary conversion product before subjecting the primary conversion product to the separate further hydrolyzation, and in cases where a volatile solvent is employed for recovering the hydrogen chloride from the primary conversion product or for removing the hydrogen chloride to any desired degree, it is preferable to remove the volatile solvent from the primary conversion product prior to subjecting the primary conversion product to the separate further hydrolyzation.

The removal of the diluents and/or volatile solvents can be effected in any convenient way as for instance by gently heating the materials with or without the aid of reduced pressure. In cases where the diluents and/or volatile solvents are not removed prior to the treatment for further hydrolyzation they may, of course, be recovered from the water or solutions employed for the further hydrolyzation in any convenient way. As many of the diluents and solvents are insoluble in water their recovery can be effected by a simple separation from the water or solutions employed for the further hydrolyzation.

The invention is not limited as to the cellulose or cellulosic materials to be employed. Instances of celluloses or cellulosic materials especially useful for the purposes of the invention are wood, straw, grasses, cotton, wood pulps (e. g. sulphite, sulphate, or soda pulps), reconstituted cellulose. Preferably, the cellulose or cellulosic materials are employed in a fine form, e. g. cotton fibres, cotton linters, wood pulp in the form of fine chips, sawdust, ground mechanical wood pulp.

The process of the invention enables the primary conversion products, and products of further conversion such as sugars to be readily attained in a very high yield; yields of over 90% can in fact be readily attained. As will be seen from the above description, the use of diluents has many advantages. Thus, for instance, the diluents enable the reaction to be performed without difficulties arising from heat evolved from reaction between the cellulose and the acid and without necessitating the strong or extensive cooling heretofore necessary. Moreover, the use of the diluents enables very small quantities of acid to be employed. In many cases the quantities of acid are so low that their recovery is not a matter of any moment. The diluents, however, enable the acid to be readily recovered for re-use or to be readily removed from the conversion products. Further, the diluents enable a very uniform attack upon the materials to be attained, thereby avoiding excessive loss of yield through local excessive action upon the materials. For instance, the uniformity of reaction resulting from the presence of the diluents substantially prevents the formation of sugars during the formation of the primary conversion products, a feature of importance as sugars formed at such time are very liable to become destroyed before the whole of the cellulose or cellulosic material has become converted to the primary conversion products.

The following example serves to illustrate a convenient form of execution of the invention, it being understood that it is given only by way of illustration:—

*Example*

Cellulose containing about 30% humidity (natural or added) is impregnated with about an equal weight of benzene, ether or petroleum ether. The impregnated material is charged into a rotating drum or tumbler barrel, and whilst maintaining the material at 30° to 40° C. vapours of strong hydrochloric acid, preferably saturated with vapours of the solvent employed in the impregnation (benzene, ether or petroleum ether), are introduced. The vapours are passed for 4 to 6 hours, whereafter the organic diluent and hydrogen chloride are removed as far as possible, as for instance by stirring the product with water preferably followed by further washing with water, or for instance by extraction with organic liquids, e. g. with acetone. If water is employed the organic diluent being insoluble in water may readily be separated from the water in any convenient separation vessel. The primary conversion product, after separation of the diluent and acid, may if desired be subjected to further hydrolysis.

What I claim and desire to secure by Letters Patent is:—

1. Process for the transformation of cellulosic material into conversion products which comprises hydrolyzing the said material in the presence of a volatile mineral acid and an organic diluent.

2. Process for the transformation of cellulosic material into conversion products which comprises hydrolyzing the said material in the presence of an organic diluent substantially insoluble in water and a volatile mineral acid.

3. Process for the transformation of cellulosic material into conversion products which comprises hydrolyzing the said material in the presence of an organic diluent substantially insoluble in water and hydrochloric acid.

4. Process for the transformation of cellulosic material into conversion products which comprises hydrolyzing the said material in the presence of a volatile mineral acid and benzene.

5. Process for the transformation of cellulosic material into conversion products which comprises hydrolyzing the said material in the presence of a volatile mineral acid and petroleum ether.

6. Process for the transformation of cellulosic material into conversion products which comprises hydrolyzing the said material in the presence of a volatile mineral acid and ether.

7. Process for the transformation of cellulosic material into conversion products which comprises treating the said material with the vapor of a volatile mineral acid in the presence of an organic diluent.

8. Process for the transformation of cellulosic material into conversion products which comprises treating the said material with gaseous hydrochloric acid in the presence of an organic diluent.

9. Process for the transformation of cellulosic material into conversion products which comprises treating the said material with a volatile mineral acid in the presence of an organic diluent substantially insoluble in water and an amount of water less than 80% relative to the weight of cellulose present.

10. Process for the transformation of cellulosic material into conversion products which comprises treating the said material with hydrochloric acid in the presence of an organic diluent substantially insoluble in water and an amount of water less than 30% relative to the weight of cellulosic material.

11. Process for the transformation of cellulosic material into conversion products which comprises impregnating the said cellulosic material with an organic diluent substantially insoluble in water and passing the vapor of a volatile mineral acid into the material.

12. Process for the transformation of cellulosic material into conversion products which comprises impregnating the said cellulosic material with an organic diluent substantially insoluble in water and passing gaseous hydrochloric acid into the material.

13. Process for the transformation of cellulosic material into conversion products which comprises hydrolyzing the said material at temperatures between about 10 and 40° C. in the presence of an organic diluent substantially insoluble in water and hydrochloric acid.

14. Process for the transformation of cellulosic material into conversion products which comprises hydrolyzing the said material in the presence of an organic diluent substantially insoluble in water and a volatile mineral acid, and terminating the reaction before any substantial proportion of water soluble conversion products has been formed.

15. Process according to claim 14 and wherein the primary conversion products are subjected to separate and further hydrolysis.

16. Process for the transformation of cellulosic material containing about 30% humidity into conversion products, comprising transforming the material into primary conversion products by treatment with gaseous hydrochloric acid at temperatures between 10 and 40° C., and in the presence of an organic diluent substantially insoluble in water, and then subjecting the said primary conversion products to separate and further hydrolysis to produce water soluble substances.

HENRY DREYFUS.